United States Patent [19]

Beaumont et al.

[11] 4,398,133
[45] Aug. 9, 1983

[54] HIGH FREQUENCY COMPUTER TERMINAL POWER SUPPLY WITH ISOLATION

[75] Inventors: Gregory J. Beaumont, Arlington Heights; Theodore J. Godawski, Des Plaines; James P. McShane, Chicago; James J. Parker, Elmhurst, all of Ill.

[73] Assignee: Zenith Radio Corporation, Glenview, Ill.

[21] Appl. No.: 228,410

[22] Filed: Jan. 26, 1981

[51] Int. Cl.³ .............................................. H01J 29/70
[52] U.S. Cl. ...................................... 315/411; 358/190
[58] Field of Search ........................ 315/411; 358/190

[56] References Cited

U.S. PATENT DOCUMENTS

| 3,641,267 | 2/1972 | Cavallari | 375/492 X |
| 4,245,180 | 1/1981 | Rilly et al. | 315/411 |
| 4,301,394 | 11/1981 | Dietz | 315/411 X |
| 4,321,512 | 3/1982 | Alvord et al. | 315/411 |

Primary Examiner—Theodore M. Blum

[57] ABSTRACT

A power supply for use in a computer terminal capable of providing a plurality of direct voltage signals to the computer terminal logic system while isolating this logic circuitry from the line voltage is disclosed. A high frequency power supply transformer and associated circuitry provides the various direct voltage signals to the computer terminal logic system and provides isolation between the line input and logic circuitry. Parallel isolation is provided by a horizontal sync coupling circuit which is driven by the logic system and which, in turn, synchronizes the horizontal deflection system. The direct voltage signals provided to the logic supply system are both scan- and pulse-derived from the horizontal sweep signal permitting various computer terminal systems to be operated by display-derived power output signals.

9 Claims, 5 Drawing Figures

HIGH FREQUENCY COMPUTER TERMINAL POWER SUPPLY WITH ISOLATION

Cross-Reference to Related Application

This application is related to but in no way dependent upon the following application which is assigned to the assignee of the present application: Ser. No. 179,328, filed Aug. 18, 1980, entitled "Regulated Video Display Terminal Power Supply", in the names of Robert J. Alvord, Gregory J. Beaumont and Richard J. Steinmetz.

BACKGROUND OF THE INVENTION

This invention relates generally to a computer terminal having a video display, and particularly relates to a computer terminal energized by signals from a video display incorporated therein.

A computer terminal generally includes a power supply, a video monitor, a keyboard and logic circuitry. The user provides inputs via the keyboard and receives visual feedback from the monitor. The power supply generally energizes all video terminal components and the digital logic circuitry permits the terminal to perform sophisticated computations and/or information retrieval operations and to display this information on the video monitor for the operator's use.

Prior art computer terminal power supplies are generally either of the linear regulator type or of the switch mode type. The switch mode type of power supply generally utilizes a single voltage regulator with various conductive modes selectively switched in to provide various DC output signals. The problem with this approach is that the switching of all of the non-linear regulators occurs during the video display time interval producing display distortions during switching. The linear regulator power supply typically generates many B+ voltages from a power transformer and provides linear regulation for each of the B+ voltages. This approach is expensive because of the potentially large number of regulators required and is inefficient from a power utilization standpoint. In addition, the large power transformer required generates a substantial amount of heat which must be eliminated and the inductive leakage of this large transformer can readily degrade video imagery. In addition, those prior art computer terminal power supplies which have provided adequate isolation between the line voltage source and the various computer terminal components energized therefrom, have done so at low signal frequencies and have suffered from such limitations as increased size and signal filtering requirements. It is particularly important in this environment to provide adequate isolation for computer terminal logic circuitry which is highly susceptible to damage or program dropouts caused by fluctuations in the utility-provided line voltage source.

FIG. 1 shows a typical prior art power supply arrangement for a computer terminal. A line voltage source 10 typically provides 110 VAC or 220 VAC to a computer terminal power supply 12. Power supply 12 then provides various DC voltage levels to computer logic system 14 which generates synchronization signals which are then provided to the computer terminal/display 16. These sync signals provide proper timing between the horizontal and vertical sweep of the electron beam in the video display's cathode ray tube and the rate at which video information is provided to the video display. In addition, power supply 12 simultaneously provides energizing voltages to the various deflection systems and video signal processing and amplification circuitry in the video display. In this configuration the line operated power supply 12 provides some level of isolation for computer terminal logic system 14 from the high voltage line source 10 but at low signal frequencies thus encountering operating problems associated therewith.

One approach to a video display power supply design is disclosed in U.S. Pat. No. 3,641,267 to Cavallari wherein is described a power supply designed for stepping down an AC or DC input source to a stable DC input level. In this power supply a chopper circuit incorporating one or more normally blocked transistors is inserted between the input circuit and a load circuit. Voltage stabilization of the output signal is achieved by incorporating a voltage-limiting device such as a Zener diode in the input circuit which limits the amplitude of the output of the input transistor and hence the voltage level of the power supply output signal. With a transformer incorporated in the network and the Zener diode coupled to a secondary winding of the transformer, the current flowing through the primary winding will be controlled by the Zener in that excess secondary current is dissipated through the Zener diode connected between the base and the emitter of the associated transistor. The Cavallari invention is intended primarily to permit a large number of stable DC level output signals to be produced from an AC or DC input signal varying in voltage. The requirement for an expensive step down voltage transformer is avoided in Cavallari by providing the unblocking pulses to the normally blocked transistors from the flyback pulse of the horizontal sweep circuit. Cavallari, as such, is not intended to provide the isolation from the input line voltage source required for the sensitive logic circuitry of a computer terminal.

The present invention is intended to avoid the aforementioned computer terminal and video display power supply problems by providing a plurality of direct voltage signals to logic circuitry in a computer terminal in which the logic circuitry is isolated from the input line voltage source and the various DC signals provided to the logic circuitry can be controlled by a line operated power supply which provides high voltage isolation for sensitive computer terminal components and systems.

OBJECTS OF THE INVENTION

Accordingly, it is an object of the present invention to provide an improved power supply for a computer terminal.

It is another object of the present invention to provide a high frequency power supply for a computer terminal offering the advantages of smaller size, increase efficiency and isolation between various system components.

Stil another object of the present invention is to provide a power supply for a computer terminal with improved voltage regulation.

Still another object of the present invention is to provide an improved power supply for a computer terminal capable of providing a plurality of precisely regulated DC voltages to the computer terminal logic system.

BRIEF DESCRIPTION OF THE DRAWINGS

The appended claims set forth those novel features believed characteristic of the invention. However, the invention itself, as well as further objects and advantages thereof, will best be understood by reference to the following detailed description of a preferred embodiment taken in conjunction with the accompanying drawings in which:

DESCRIPTION OF THE PREFERRED EMBODIMENTS

Figure 1:
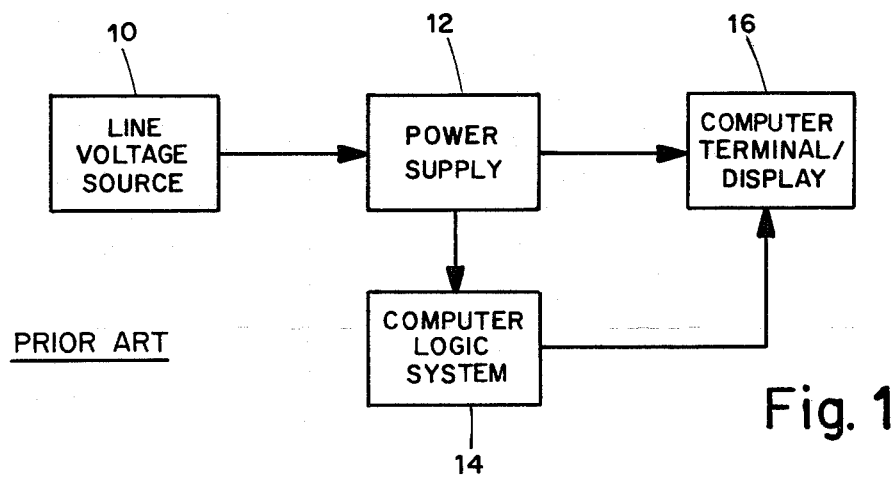
FIG. 1 shows a simplified block diagram of the general configuration of a prior art computer terminal/display with a line voltage energized power supply and computer logic system.
Figure 2:
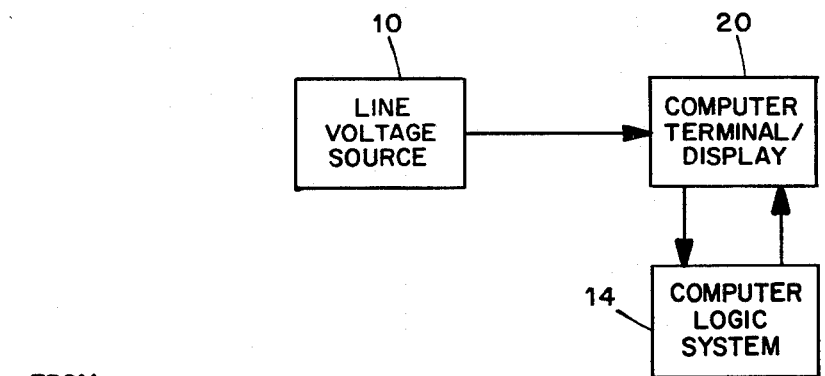
FIG. 2 shows a simplified block diagram of a computer terminal/display including a computer logic system operated by a power supply connected to a line voltage source in accordance with the present invention.

Referring to FIG. 2, there is shown a generalized block diagram of a computer terminal/display 20 energized by a standard line voltage source 10 and a computer logic system 14 which is energized by direct voltage signals generated by the horizontal deflection system which controls the electron beam in the video display of computer terminal/display 20. These direct voltages not only require a high level of regulation in order to provide precise DC signal levels in operating the various logic circuits, but the logic system power supply must also afford a high level of isolation between computer logic system 14 and line voltage source 10. In addition, the power supply energizing computer logic system 14 should be capable of varying the level of the direct voltage signals provided to logic system 14 to permit the integration of various logic systems with a particular video display in a computer terminal. Logic system 14 provides various signals to the video display including horizontal and vertical synchronization (sync) and video sync signals in coordinating video display electron beam position with the video information being provided to the display.

Figure 3:
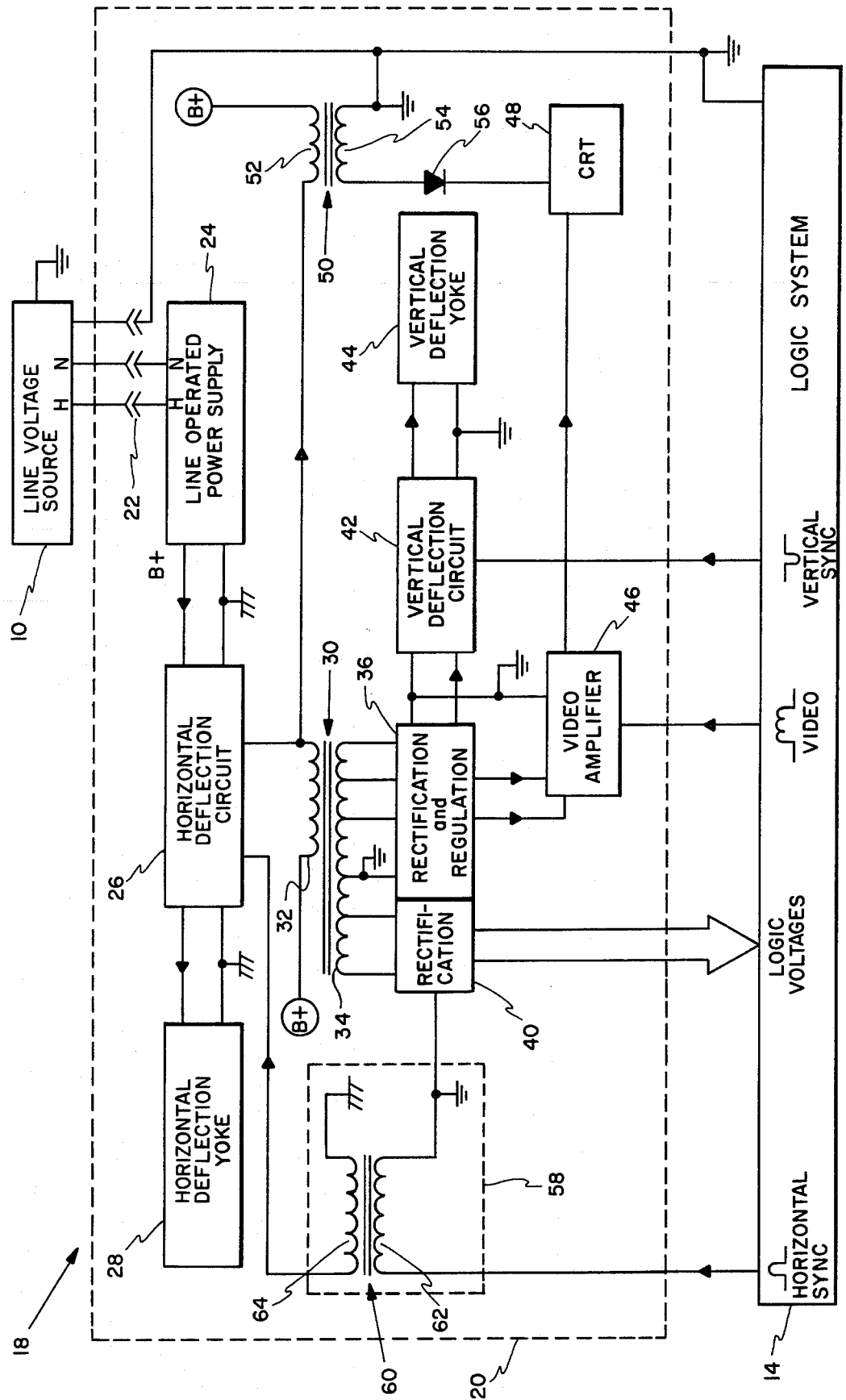
FIG. 3 which is partially in block diagram form and partially in schematic diagram form shows a high frequency computer terminal power supply with isolation in accordance with a preferred embodiment of the present invention.

Referring to FIG. 3, there is shown in greater detail a high frequency computer terminal power supply with isolation 18 in accordance with a preferred embodiment of the present invention. An alternating input voltage is provided by means of a line voltage source 10 which is typically utility provided. Line voltage source 10 is grounded to earth ground potential and may be accessed by means of a plug 22 which generally incorporates three terminals. The terminals are connected to three leads which are designated hot, or current-carrying, neutral ground, and earth ground. Connected to plug 22 is a line operated power supply 24 which provides rectification and regulation for the AC input from line voltage source 10. Line operated power supply 24 provides a direct voltage B+ signal to various components of computer terminal/display 20 while maintaining a variable reference to earth ground. Line operated power supply 24 operates on the potential difference between the hot and neutral leads from line voltage source 10 and is of conventional design. This line operated power supply also incorporates an output voltage control (not shown) which is also generally available in such power supplies. This control permits the B+ output voltage to be selectively varied independently of the input line voltage.

The rectified and regulated B+ output voltage from line operated power supply 24 is provided to horizontal deflection circuit 26. Horizontal deflection circuit 26 controls the horizontal sweep and retrace of the electron beam in the computer terminal's cathode ray tube (CRT). The signals generated by horizontal deflection circuit 26 include scan and retrace pulses which are provided to the primary winding 32 of logic transformer 30. The signals provided from horizontal deflection circuit 26 to logic transformer 30 are thus scan-and retrace-derived from the electron beam sweep inducing signals originating in horizontal deflection circuit 26. These horizontal scan and retrace signals are also provided from horizontal deflection circuit 26 to horizontal deflection yoke 28 after being synchronized with the video information to be displayed in a manner which will be subsequently described. Line operated power supply 24, horizontal deflection circuit 26, and horizontal deflection yoke 28 are maintained at a chassis ground potential which lies between earth, or neutral, ground potential and the operating voltage of these systems and, as such, represent the "hot", or high voltage, elements of the computer terminal power supply 18 of the present invention. A detailed description of a preferred embodiment of logic transformer 30 and associated circuitry utilized in a similar although unrelated power supply is disclosed in patent application Ser. No. 179,328, filed Aug. 18, 1980, entitled "Regulated Video Display Terminal Power Supply," which is assigned to the assignee of the present application and which is hereby incorporated by reference in the present application.

The primary winding 32 of logic transformer 30 is energized by the B+ output of line operated power supply 24. The horizontal deflection signals from horizontal deflection circuit 26 are also provided to primary winding 32 and induce signals on the secondary windings 34 of logic transformer 30. With secondary windings 34 inductively coupled to primary winding 32, the output signal level of each of the secondary windings is a function of the number of turns of the individual secondary winding relative to the number of turns of primary winding 32. The AC output signals from secondary coils 34 are then either rectified and regulated by means of rectification and regulation circuit 36 or are simply rectified by means of rectification circuit 40. Thus, a plurality of secondary coil outputs are provided to rectification and regulation circuit 36 and also to rectification circuit 40. Rectification circuit 40 is connected to logic system 14 such that a plurality of direct voltage signals are provided to logic system 14 to drive the various logic circuits therein. In the preferred embodiment of the present invention, three direct voltage signals are provided from rectification circuit 40 to logic system 14 having the voltage values of $+12$, $+5$, and $-12$ VDC. The present invention is not limited to providing these specific voltages to logic system 14. The voltages and number of signals output by rectification circuit 40 and rectification and regulation circuit 36 are limited only by the number of turns of secondary windings 34 relative to those of primary winding 32 and by the number of secondary windings 34 utilized. Similarily, the design and configuration of rectificatiion circuit 40 and rectification/regulation circuit 36 do not form a part of the present invention as any of the more conventional rectification and regulation circuits could be utilized equally well in the present invention.

Because the outputs from those secondary windings 34 coupled to logic system 14 are only rectified by means of rectification circuit 40, the voltages of the signals provided to logic system 14 may be varied by means of the control element (not shown) in line operated power supply 24. By manipulating the B+ output voltage from line operated power supply 24 by means of this conventional control element, the B+ voltage provided to horizontal deflection circuit 26 and the output therefrom to primary winding 32 of transformer 30 may be precisely controlled. In turn, the voltage levels of the signals induced on secondary coils 34 may be selectively controlled such that the voltages eventually provided to logic system 14 for energizing the various logic circuits therein may be selectively controlled. This feature not only permits computer terminal/display 20 to be integrated with a great variety of logic systems 14 having various drive signal level requirements, but also allows for the precise control of signal voltage levels delivered to logic system 14 which is totally isolated not only from the line voltage source 10 but also from the means by which these voltages are varied in line operated power supply 24. This configuration allows for the protection of sensitive logic system circuitry from voltage variations and reference discrepancies in the line voltage system and enhances safety by permitting logic system repair and/or replacement to be made in a relatively low voltage environment. This is made possible by grounding rectification circuit 40, rectification/regulation circuit 36 and logic system 14 to earth ground potential.

Regulated DC signals are provided from rectification and regulation circuit 36 for energizing vertical deflection circuit 42 which, in turn, drives vertical deflection yoke 44. It is the magnetic field generated by vertical deflection yoke 44 which controls the vertical position of the electron beam in the cathode ray tube of the video display. Horizontal scan-derived signals are provided by horizontal deflection circuit 26 to primary winding 32 causing signals to be induced in a secondary winding 34 of logic transformer 30 which are rectified and regulated and used to drive vertical deflection circuit 42. Similarly, the scan portion of the horizontal drive signal output from horizontal deflection circuit 26 is used to provide signals to video amplifier 46 from rectification and regulation circuit 36. Thus, the signals energizing vertical deflection circuit 42 and video amplifier 46 are derived from the scan portion of the horizontal drive signals. In addition, a second input is provided to video amplifier 46 from rectification/regulation circuit 36 which allows for the control of the brightness of the video display by controlling the operation of video amplifier 46. The signal provided by rectification/regulation circuit 36 to video amplifier 46 for controlling the video display brightness is derived from the scan and retrace portions of the horizontal deflection output signal and is therefore a positive to a negatively controlled variable voltage. Video amplifier 46 is coupled to CRT 48 in controlling the intensity of the electron beam incident upon the faceplate of CRT 48 and ultimately controls the brightness of the video display itself.

The various DC voltage levels provided to logic system 14 drive various logic circuitry therein to generate synchronization (sync) signals for driving various components of the computer terminal/display system 20. These sync signals coordinate the rate at which video information is provided to the video display of computer terminal/display system 20 and the rate at which the electron beam therein is scanned across the faceplate of CRT 48. Thus, timed video signals are provided by logic system 14 to video amplifier 46 for amplification and delivery to CRT 48. In addition, sync signals in the form of negative and positive pulses are provided as vertical and horizontal sync signals, respectively, to vertical and horizontal deflection circuits 42 and 26. The horizontal sync signals are coupled from logic system 14 to horizontal deflection circuit 26 by means of horizontal sync isolation circuit 58. Isolation circuit 58 is in parallel with logic transformer 30 and provides parallel isolation of the "cold" logic system 14 from the "hot" horizontal deflection circuit 26. Here the "cold" refers to earth ground components while "hot" refers to chassis, or floating, ground components. Isolation circuit 58 may take on any of a variety of forms and is shown in FIG. 3 as an isolation transformer 60. The horizontal sync pulses are provided by logic system 14 to the primary winding 62 of isolation transformer 60 with the primary winding inductively coupled to a stationary winding 64. The sync pulses induced on secondary winding 64 are delivered to horizontal deflection circuitry 26 and thence to horizontal deflection yoke 28 for proper synchronization of the sawtooth deflection signals provided to horizontal deflection yoke 28. Primary winding 62 of isolation transformer 60 is connected to earth ground while secondary winding 64 is chassis ground referenced.

Figure 4A:
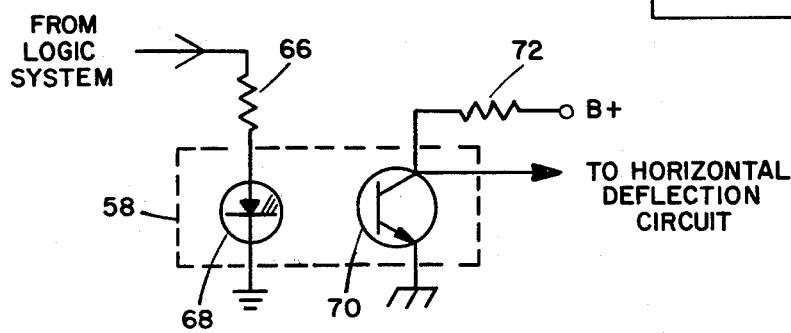
FIGS. 4A and 4B show alternative configurations of the parallel isolation circuit coupling the horizontal sync pulse derived from the logic system with the horizontal deflection circuit in accordance with the present invention.
Figure 4B:
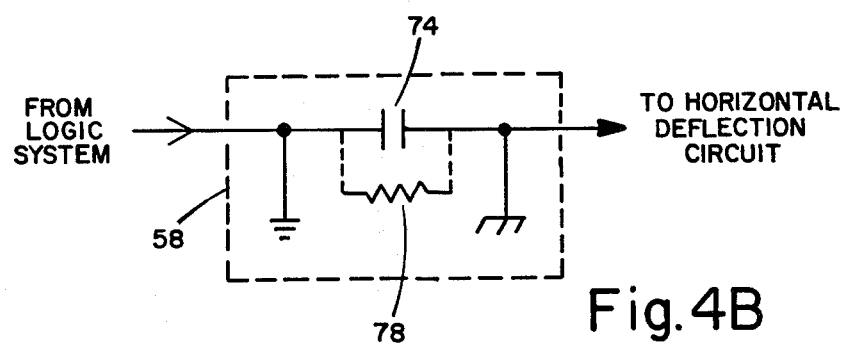

Isolation circuit 58 may take on forms other than that of an isolation transformer as shown in FIGS. 4A and 4B. Shown in FIG. 4A is another embodiment of horizontal sync isolation circuit 58 which could be utilized in the present invention. Connected to logic system 14 by means of resistor 66 is a light emitting diode 68 coupled to earth ground. Upon receipt of horizontal sync signals from logic system 14 light emitting diode (LED) 68 emits photons which are incident upon and turn-on photo-transistor 70, the output of which is coupled to horizontal deflection circuit 26. The emitter of photo-transistor 70 is coupled to chassis ground while its collector receives the B+ supply voltage from line operated power supply 24. The values of resistors 66 and 72 are selected to establish the turn-on states of LED 68 and photo-transistor 70, respectively.

Shown in FIG. 4B is still another embodiment of horizontal sync isolation circuit 58 which could be utilized in the present invention. This embodiment employs a capacitor 74 coupled between logic system 14 and horizontal deflection circuit 26. The plate of capacitor 74 connected to logic system 14 is coupled to earth ground while the plate connected to horizontal deflection circuit 26 is maintained at chassis ground. A high resistance across the plates of capacitor 74 indicated in FIG. 4B as resistor 78 provides a high level of isolation between logic system 14 and the high voltage at which the horizontal deflection circuit 26 is maintained.

The horizontal drive signals provided by horizontal deflection circuit 26 to the primary winding 32 of logic transformer 30 are also provided to the primary winding 52 of horizontal flyback, or sweep, transformer 50. Primary winding 52 of horizontal sweep transformer 50 is coupled in parallel with primary winding 32 of logic transformer 30 to the B+ output voltage of line operated power supply 24. Secondary winding 54 of horizontal sweep transformer 50 possesses a high number of turns relative to primary winding 52 to permit the generation of high voltage output signals from secondary winding 54. These high voltage output signals from secondary winding 54 are coupled through rectifying diode 56 to CRT 48 in providing a high anode voltage thereto for acceleration of the electron beam within CRT 48. Typical values of the voltages provided by horizontal sweep transformer 50 to CRT 48 are in the neighborhood of 13 KV. Primary winding 52 is coupled to line operated power supply 24 for receiving the B+ supply voltage and is thus referenced to chassis ground, while secondary winding 54 of horizontal sweep transformer 50 is referenced to earth ground.

Horizontal deflection circuit 26 operates at typical monitor scan frequencies thus delivering high frequency signals to primary winding 32 of logic transformer 30. These high frequencies permit a reduction in the size of logic transformer 30 and thus a reduction in the overall size of computer terminal power supply 18. An additional advantage of driving the power supply of the present invention by means of the horizontal deflection circuit 26 is that less filtering is required for power supply outputs at these high operating frequencies. Required filtering capacity is a function of the repetition rate of output signal ripple and as the ripple rate increases filter requirements decrease. This also leads to a reduction in power supply size by reducing the number and size of electrolytic capacitors used for filtering power supply output signals. The output of horizontal deflection circuit 26 to primary winding 32 is nominally a 1200 volt peak-to-peak pulse having a repetition rate equal to the horizontal scan frequency.

Isolation between the chassis ground referenced high voltage components such as the line operated power supply 24, and horizontal deflection circuit 26 and yoke 28 is provided by logic transformer 30, horizontal sync coupling circuit 58 and sweep transformer 50. In a preferred embodiment of the present invention horizontal sync coupling circuit is comprised of a coupling transformer the secondary winding 64 of which is also referenced to chassis ground as is the primary winding 32 of logic transformer 30 and the primary winding of transformer 50. All other components in the high frequency computer terminal power supply 18 of the present invention, including video amplifier 46, vertical deflection circuit 42 and yoke 44, and logic system 14 are maintained at relatively low voltages and referenced to earth potential. This isolation offers the advantages of increased safety for logic system circuitry and for personnel involved in the repair, replacement or modification of logic system circuitry. In addition, the "hot" line operated power supply 24 provides an isolated means for adjusting the DC voltages provided to "cold" logic system circuitry providing increased interfacing capability for computer terminal/display 20 with respect to various logic systems 14.

There has thus been shown a power supply for use in a computer terminal which offers the advantages of small size, isolation between "hot" and "cold" system components and improved voltage regulation of the various DC signals provided to computer logic circuitry by means of a single regulation device.

While particular embodiments of the invention have been shown and described, it will be obvious to those skilled in the art that changes and modifications may be made without departing from the invention in its broader aspects and, therefore, the aim in the appended claims is to cover all such changes and modifications as fall within the true spirit and scope of the invention. The matters set forth in the foregoing description and accompanying drawings is offered by way of illustration only and not as limitation. The actual scope of the invention is intended to be defined in the following claims when viewed in their proper perspective based on the prior art.

We claim:

1. In a computer terminal including a video display, said video display including high voltage horizontal and low voltage vertical deflection systems for the scan and retrace of an electron beam across a faceplate of a cathode ray tube in said video display and a video amplifier for controlling the video level of an image displayed on said cathode ray tube, and logic means energized by a plurality of low voltage DC signals and coupled to said video amplifier for providing video information thereto for display on said cathode ray tube and to said horizontal and vertical deflection systems for synchronizing electron beam sweep across the faceplate of said cathode ray tube with said video information, a power supply energized directly by a high voltage AC line source for providing a plurality of said low voltage DC signals from said common AC line voltage source to said logic means while isolating said logic means from said high voltage line source comprising:

first rectification and regulation means coupled to said AC line voltage source to produce a regulated DC high B+ voltage and coupled to said horizontal deflection system for providing said B+ voltage thereto;

first transformer means having a high voltage primary winding coupled inductively to a plurality of low voltage secondary windings, said primary winding energized by said B+ voltage and coupled to said horizontal deflection system for receiving deflection signals therefrom;

said rectification and regulation means coupled to said secondary windings to produce a direct voltage signal from the signals induced on each of said secondary coils by said primary coil and coupled to said logic means, said vertical deflection system and said video amplifier; and second transformer means having a low voltage primary winding coupled to said logic means for receiving horizontal synchronization signals therefrom and a high voltage secondary winding inductively coupled to said primary winding and connected to said horizontal deflection system for providing said horizontal synchronization signals thereto.

2. A power supply as in claim 1 wherein the signals provided by the low voltage secondary windings of said first transformer means to said second rectification and regulation means are produced by the scan and retrace signals of the horizontal deflection system.

3. A power supply as in claim 1 wherein said second rectification and regulation means further includes means for providing a brightness control signal to said video amplifier, said brightness control signal comprised of a horizontal scan-derived positive voltage component and a horizontal retrace-derived negative voltage component.

4. A power supply as in claim 1 wherein said first rectification and regulation means, said horizontal deflection system and the primary winding of said second transformer means are referenced to a chassis ground potential and said second rectification and regulation means, said vertical deflection system, said video amplifier, said logic system, and the primary winding of said second transformer means are referenced to earth ground potential, said chassis ground being of high voltage than said earth ground potential.

5. A power supply as in claim 1 wherein said first rectification and regulation means includes adjustable control means for changing the regulated DC high B+ voltage provided to said horizontal deflection system thus permitting the DC voltage signals provided to said logic means to be controlled by means of said first rectification and regulation means.

6. In a computer terminal including a video display, said video display including high voltage horizontal and low voltage vertical deflection systems for the scan and retrace of an electron beam across a faceplate of a cathode ray tube in said video display and a video amplifier for controlling the video level of an image displayed on said cathode ray tube, and logic means energized by a plurality of low voltage DC signals and coupled to said video amplifier for providing video information thereto for display on said cathode ray tube and to said horizontal and vertical deflection systems for synchronizing electron beam sweep across the faceplate of said cathode ray tube with said video information, a power supply energized directly by a high voltage AC line source for providing a plurality of said low voltage DC signals from said common AC line voltage source to said logic means while isolating said logic means from said high voltage line source comprising:

first rectification and regulation means coupled to said AC line voltage source to produce a regulated DC high B+ voltage and coupled to said horizontal deflection system for providing said B+ voltage thereto, said first rectification and regulation means including adjustable control means permitting the value of said regulated DC B+ voltage to be varied;

first transformer means having a high voltage primary winding coupled inductively to a plurality of low voltage secondary windings, said primary winding energized by said B+ voltage and coupled to said horizontal deflection system for receiving deflection signals therefrom, said deflection signals being derived from the scan and retrace signals of the horizontal deflection system;

second rectification and regulation means coupled to said secondary windings to produce a direct voltage signal from the signals induced on each of said secondary coils by said primary coil and coupled to said vertical deflection system, said video amplifier and to said logic means, whereby the voltage of the DC signals provided to said logic means may be varied by means of the adjustable control means of said first rectification and regulation means;

second transformer means having a low voltage primary winding coupled to said logic means for receiving horizontal synchronization signals therefrom and a high voltage secondary winding inductively coupled to said primary winding and connected to said horizontal deflection system for providing said horizontal synchronization signals thereto;

horizontal sweep transformer means including a primary winding inductively coupled to a secondary winding, said primary winding connected to said first rectification and regulation means and energized by said high B+ voltage and to said horizontal deflection system for receiving deflection signals therefrom and for inducing a large alternating voltage in said secondary winding; and third rectification means coupling the secondary winding of said horizontal sweep transformer means to said cathode ray tube for providing a high voltage DC signal to said cathode ray tube in generating said electron beam therein.

7. In a computer terminal including a video display, said video display including high voltage horizontal and low voltage vertical deflection systems for the scan and retrace of an electron beam across a faceplate of a cathode ray tube in said video display and a video amplifier for controlling the video level of an image displayed on said cathode ray tube, and logic means energized by a plurality of low voltage DC signals and coupled to said video amplifier for providing video information thereto for display on said cathode ray tube and to said horizontal and vertical deflection systems for synchronizing electron beam sweep across the faceplate of said cathode ray tube with said video information, a power supply energized directly by a high voltage AC line source for providing a plurality of said low voltage DC signals from said common AC line voltage source to said logic means while isolating said logic means from said high voltage line source comprising:

first rectification and regulation means coupled to said AC line voltage source to produce a regulated DC high B+ voltage and coupled to said horizontal deflection system for providing said B+ voltage thereto;

first transformer means having a high voltage primary winding coupled inductively to a plurality of low voltage secondary windings, said primary winding means energized by said B+ voltage and coupled to said horizontal deflection system for receiving deflection signals therefrom;

second rectification and regulation means coupled to said secondary windings to produce a direct voltage signal from the signals induced on each of said secondary coils by said primary coil and coupled to said logic means, said vertical deflection system and said video amplifier; and isolation means having a low voltage input stage coupled to said logic means for receiving horizontal synchronization signals therefrom and a high voltage output stage coupled to said horizontal deflection system for providing said horizontal synchronization signals thereto.

8. A power supply as in claim 7 wherein said input stage includes a light emitting diode and said output stage includes a phototransistor.

9. A power supply as in claim 7 wherein said isolation means comprises a capacitor having a positive electrode coupled to said logic means and a negative electrode coupled to said horizontal deflection system.

* * * * *